United States Patent [19]
Prada

[11] 3,994,536
[45] Nov. 30, 1976

[54] BRAKE-RELEASE ACCELERATING DEVICE AND AUTOMATIC GRADUAL-DISCHARGE FLUID BRAKE

[75] Inventor: Cesare Prada, Turin, Italy

[73] Assignee: WABCO Westinghouse GmbH, Turin, Italy

[22] Filed: Dec. 30, 1975

[21] Appl. No.: 645,319

[30] Foreign Application Priority Data
Dec. 31, 1974 Italy .................................. 70801/74

[52] U.S. Cl. .................................... 303/64; 303/74
[51] Int. Cl.² ......................................... B60T 15/48
[58] Field of Search ................... 303/29, 40, 64, 69, 303/74

[56] References Cited
UNITED STATES PATENTS

| | | | |
|---|---|---|---|
| 2,039,732 | 5/1936 | McCune | 303/64 |
| 2,367,604 | 1/1945 | Oliver | 303/64 |
| 2,923,577 | 2/1960 | McClure et al. | 303/64 X |

*Primary Examiner*—Duane A. Reger
*Attorney, Agent, or Firm*—W. F. Poore; R. W. McIntire, Jr.

[57] ABSTRACT

The present invention concerns automatic fluid brake devices in which the fill and discharge of the brake cylinder or cylinders of the equipment are controlled by a device functioning as a distributing valve in relation to pressure variations in the brake pipe.

In the aforementioned automatic braking devices generally used for rail vehicles, and commonly known as distributors, the brake cylinder pressure obtained during the braking process is a function of the pressure in the brake pipe.

The present invention concerns distributors of the graduated release type, in which brake release is not only initiated via pressure increase in the brake pipe, but it is entirely a function of the pressure increase in this brake pipe.

More specifically, the present invention concerns the type of graduated release distributor in which the discharge is adjustable, and the brake is inexhaustible regardless of the manner in which the valve is manipulated by the engine driver to carry out braking or brake release.

6 Claims, 3 Drawing Figures

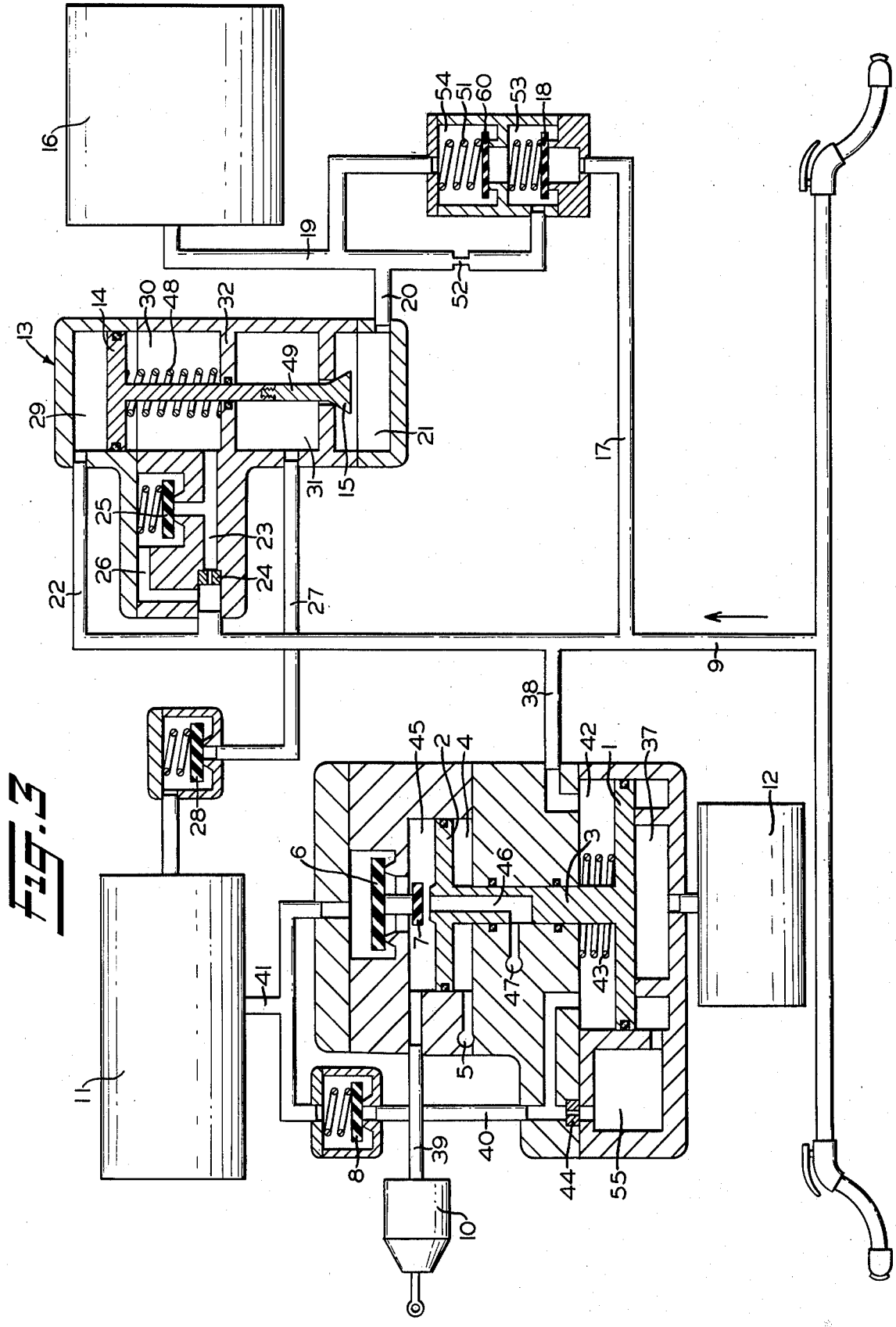

BRAKE-RELEASE ACCELERATING DEVICE AND AUTOMATIC GRADUAL-DISCHARGE FLUID BRAKE

BACKGROUND OF THE INVENTION

In the brakes of the graduated release type, the air distribution is controlled by three pressures:
— that of the brake pipe,
— that of a constant-pressure reservoir known as the control reservoir,
— that of the brake cylinder.

However, in such brakes, the pressure in the auxiliary reservoir destined to supply the brake cylinder during braking acts on the distributor instead of the pressure of the brake pipe during braking so as to link the discharge of the brake cylinder to the pressure prevailing in the auxiliary reservoir itself. An inexhaustible brake is obtained, provided the constant-pressure or control reservoir does not sustain losses.

Although such brakes may provide ideal safety on steep inclines, since they permit long and steep descents with total safety and good maneuverability, they have a serious drawback for flat traveling: Considerable time is needed for a brake release in a long train because the discharge of the cylinder itself is linked to the filling of the auxiliary reservoir, and the slow rate at which the auxiliary reservoirs on the vehicles relatively distant from the locomotive are recharged is translated into a correspondingly slow rate of discharging of the brake cylinder.

Notable progress has been made in recent decades in accelerating the brake release process with this type of distributor by introducing into such arrangements devices capable of accelerating refill of the auxiliary reservoirs at the rear of the train by reducing the amount of air absorbed from the brake pipe by the reservoirs at the head of the train, and by means of a prolonged refill of the system to the pressure of the main reservoir without the risk of overloading the control reservoirs of the first vehicles and the concomitant possibility of undesired rebraking or difficulties in brake release.

However, although the brake release times thus obtained are notably shorter than those obtained in the past with graduated release distributors of the same type, they are still longer than desirable, particularly for level traveling.

SUMMARY OF THE INVENTION

The objective of the present invention is to provide a device that can be used with any automatic brake equipment of the aforementioned type, i.e. with a graduated release distributor, of an inexhaustible nature, controlled by the three pressures mentioned above and used to accelerate brake release of the train.

Note that the automatic brake equipment for rail vehicles are nearly all of the single-line type, which is the so-called brake pipe, whose pressure variations control braking and brake release, as stated above.

One means of accelerating brake release of long trains is to use a second line along the train known as a pressure line, which is kept permanently at a constant pressure by the main reservoir of the locomotive and is capable of constantly supplying the auxiliary reservoir of each vehicle with the normal pressure, i.e. 5 kg/cm².

Obviously, under these conditions, the auxiliary reservoir is resupplied from the pressure line during braking and is kept at a constant pressure while it supplies air to the brake cylinder instead of losing pressure.

It follows that during the brake release operation, the compressed air supplied to the brake pipe via the control valve must only refill the brake pipe itself rather than refill the auxiliary reservoirs of the vehicles along the train.

Thus, there is a much more rapid pressure increase along the entire train and, consequently, a considerable accelerated brake release.

Obviously, such a system would be cumbersome due to the addition of a second line on each vehicle and the couplings involved between the vehicles; the double coupling would also be more time-consuming.

The present invention permits accelerated brake release of the train based on a principle similar to the aforementioned two-line system, but using the current single brake pipe.

While the compressed air is supplied permanently to the auxiliary reservoir in the two-line system, it is supplied in considerable quantities to said reservoir at the instant of initial brake release from a large capacity supplementary reservoir charged to normal pressure from the brake pipe as the train travels with brakes released.

The invention is described in the following by way of example with the aid of the attached figures, in which:

FIG. 3 is a diagram of a variant of the device shown in FIG. 1.

Figure 1:
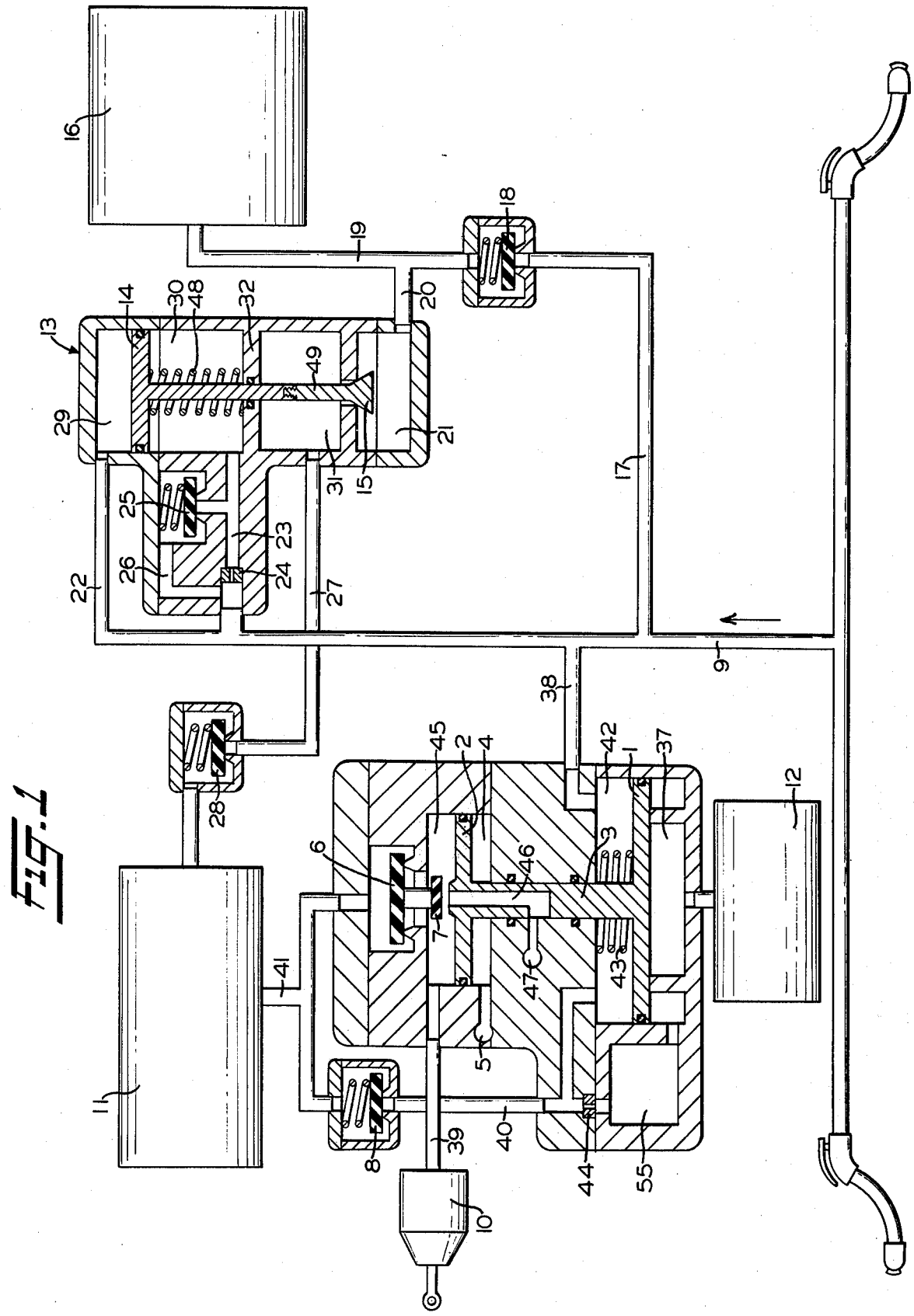
FIG. 1 is a diagram of a design of the object of the invention used in a vehicle with a basic distributor type for a graduated release inexhaustible brake; only the basic elements of such a distributor are shown.

It is shown in FIG. 1 that the distributor to which the invention is applied includes the usual elements that carry out the essentially known functions in all such graduated release brakes:
— the set of two pistons; one drive piston 1 and one equalizing piston 2, connected together by a valve stem 3 which transmits the pressure between the two pistons. The chamber 4 below the equalizing piston 2 is open to the atmosphere via the exhaust passageway 5. Above the piston 2 are the intake and discharge valves 6–7 of the brake cylinder, and the check valve for charging the auxiliary reservoir. The distributor is connected to the following external places:
— brake pipe 9 by the branch pipeline 38,
— brake cylinder 10 by the pipeline 39,
— auxiliary reservoir 11 via the pipeline 40, the check valve 8 and the pipeline 41,
— control reservoir 12 charged via the choke 44 and an appropriate control element 55 of any known type.

The object of the invention is shown on the right side of FIG. 1 and consists of:
— a high capacity supplementary reservoir 16, which is charged to normal pressure from the brake pipe 9 via the pipeline 17, the check valve 18 and the pipeline 19 while the vehicle is in motion with brakes released,
— a relay valve 13, which includes a working piston 14 for controlling an intake valve 15 via a stem 49; said valve is connected:
— to the supplementary reservoir 16 via the lines 20 and 19,

- to the brake pipe 9 via the pipeline 22, the passageway 23 with the calibrated orifice or choke 24, the check valve 25 and the passageway 26
- to the auxiliary reservoir 11 via the pipeline 27 and the check valve 28.

The relay valve 13 has four chambers:
- pilot chamber 29, connected directly to the brake pipe 9,
- chambers 30 and 31, separated by the intermediate wall 32, which is provided with pressure-tight packing between the two chambers
- the chamber 21 upstream from the intake valve 15 and connected to the supplementary reservoir 16 via the lines 20 and 19.

With reference to FIG. 1, the function of the apparatus, limited during a first cycle to the functions of the distributor alone (without the additional characteristics of the invention), is as follows:

When the valve device is assembled as shown in FIG. 1, the compressed air coming from the brake pipe 9 reaches the distributor via the pipeline 38, enters the chamber 42 above the motor piston 1, and moves this piston 1 down to the position shown in FIG. 1 with the aid of the weak spring 43.

From the chamber 42, the air from the brake pipe 9 flows through the pipe 40 to the check valve 8, and lifts it to charge the auxiliary reservoir 11 to normal pressure via the pipeline 41.

At the same time, the air from the brake pipe 9 also passes from the pipe 40 through the choke 44 to the control element 55 which is connected to the control reservoir 12 via the chamber 37. Consequently, the control reservoir 12 is charged to normal pressure carried in the brake pipe 9.

The brake cylinder 10 is open to atmosphere via the pipeline 39, the chamber 45 above the equalizing piston 2, the bore 46 within the stem 3 connected to the piston 2 itself and the exhaust passageway 47.

The compressed air from the brake pipe 9 also reaches the supplementary reservoir 16 via the pipeline 17, the check valve 18, and the pipeline 19, to charge it to the normal pressure carried in the brake pipe.

The compressed air from the brake pipe 9 also flows through the pipeline 22 to the pilot chamber 29 above the piston 14 of the relay valve 13, and through the choke 24 and the passageway 23 to the chamber 30 below said piston 14 to charge this chamber 30 to normal pressure carried in the brake pipe.

When the pressures in the two chambers 29 and 30 are nearly equalized, the drive piston 14 remains in its highest position with the possible aid of the weak spring 48, holding the intake valve 15 closed between the bottom chamber 21 and chamber 31.

When the system is charged completely to the normal pressure in the brake pipe 9, the drive piston 1 of the distributor is in equilibrium between the pressures in the chambers 42 and 37 above and below the same (pressures of the brake pipe 9 and the control reservoir 12 respectively).

As soon as the engine-driver initiates braking by bringing about a reduction of the pressure in the brake pipe 9, the distributor responds in the usual way to carry out the braking process; the pressure difference created between the brake pipe 9 acting in chamber 42 and the control reservoir 12 acting in the chambers 37 below it causes the drive piston 1 to rise, and with it the equalizing piston 2 via the stem 3, thus closing communication between the brake cylinder 10 and the atmosphere when the piston 2 rests on the discharge valve 7.

The final rise of the arrangement then causes the intake valve 6 to open, through which compressed air flows to the brake cylinder 10 via the pipe 41, the aforementioned intake valve 6, and the pipe 39.

When the pressure in the brake cylinder (which is also effective in the chamber 45 above the equalizing piston 2) has reached a value corresponding to the reduction of the pressure in the brake pipe 9, and hence in the chamber 42, the arrangement of the two pistons 1 and 2 is lowered again to cause the intake valve 6 to close, thus interrupting the supply of air to the brake cylinder 10.

By subsequently reducing the pressure in the brake pipe 9, the movable arrangement will rise again to reopen the intake valve 6 and subsequently supply a pressure to the brake cylinder 10 commensurate with the reduced pressure in the brake pipe 9.

Thus it is possible to obtain maximum pressure in the brake cylinder 10 when the pressures of the auxiliary reservoir 11 and the cylinder 10 are equalized.

However, when the engine driver increases the pressure in the brake pipe 9 and in the chamber 42, the equilibrium of the movable distributor arrangement is lost, and the arrangement moves downward from the neutral or lap braking position toward the brake release position.

The air in the brake cylinder 10 thus escapes into the atmosphere via the bore 46 in the stem 3 of the equalizing piston 2 and the exhaust passageway 47.

When the pressure in the brake cylinder 10, effective in the chamber 45 above the equalizing piston 2, has reduced to a value such as to equalize with the increased pressure of the brake pipe 9 prevailing in chamber 42, the arrangement rises again to close the discharge valve 7 to cut off flow from brake cylinder 10 to the atmosphere.

Note that the pressure in the auxiliary reservoir 11 remains greater than that in the brake pipe 9 after a specific braking process with distributors for inexhaustible graduated release brakes, using the usual capacities of the auxiliary reservoir corresponding to those of the brake cylinder.

During the brake release process, when the pressure in the brake pipe 9 has risen to the value slightly in excess of the pressure in the auxiliary reservoir 11, the air coming from the brake pipe 9 can flow to the auxiliary reservoir 11 via the check valve 8.

Thus, from this moment (under normal distributor conditions), the rise in the brake pipe 9 pressure in the chamber 42 is decelerated due to absorption by the auxiliary reservoir 11, which decelerates brake release.

Considering the complex consisting of the distributor itself, as described above, and the object of the invention used in conjunction with it, let us examine the function of the apparatus:

While the system is being charged, the compressed air coming from the brake pipe 9 enters the chamber 42 of the distributor via the pipeline 38 and reaches the supplementary reservoir 16 via the pipeline 17, the check valve 18, and the pipeline 19, charging this reservoir 16 to normal pressure; air reaches the chamber 21 of the relay valve 13 upstream from the intake valve 15 via pipeline 20.

From the brake pipe 9, the compressed air also reaches the drive chamber 29 of the relay valve 13 above the drive piston 14 via the pipeline 22, and reaches the chamber 30 below said piston 14 via the calibrated orifice or choke 24 and the passageway 23.

Thus the two chambers 29 and 30 are charged nearly simultaneously; however, despite the slight pressure disequilibrium toward the bottom, the piston 14 remains in its uppermost position due to the weak spring 48 below it, which keeps the intake valve 15 closed.

During braking operations, the function of the distributor is identical to that described earlier.

However, the pressure drop of the brake pipe 9 is transmitted to the chambers 29 and 30 above and below the drive piston 14 of the relay valve 13, to the first chamber 29 via pipeline 22, to the second chamber 30 via the check valve 25 and the passageway 26, but maintaining the pressure above and below the piston 14 in equilibrium.

During brake release, the apparatus operates as follows:

The function of the distributor is identical to that described earlier, but that of the auxiliary apparatus comprising the object of the invention varies, depending on whether the pressure increase brought about in the brake pipe 9 by the engine driver is relatively slow, say, in the case of partial brake releases during descents following partial braking processes, or whether the pressure rise in the brake pipe 9 is rapid, say, when the train has stopped for a stop signal which then changes to "go", and it is desirable to proceed again with a minimum of delay.

Precisely when the pressure increase caused by the engine driver in the brake pipe 9 is relatively slow or slight, it is transmitted immediately to the upper chamber 29 of the relay valve 13, and passes with a slight delay through the calibrated orifice 24 and the passageway 23 to the bottom chamber 30 of the relay valve 13.

Any disequilibrium between the pressures of the two chambers 29 and 30 on the opposite sides of drive piston 14 is thus insufficient to overcome the action of the weak spring 48 and drive down the piston 14 itself to open the intake valve 15 connected by the stem 49 to this piston 14.

However, in the case of, say, a brake release after stopping, the pressure increase caused by the engine driver in the brake pipe 9 will be rapid to permit the train to start as soon as possible, and the pressure increase sent to the chamber 29 of the relay valve 13 via the pipe 22 will also be rapid, while the choke 24 in the passageway 23 leading to the lower chamber 30 will increase the delay of pressure increase in this chamber 30 and cause a pressure disequilibrium between the chambers 29 and 30.

Figure 2:
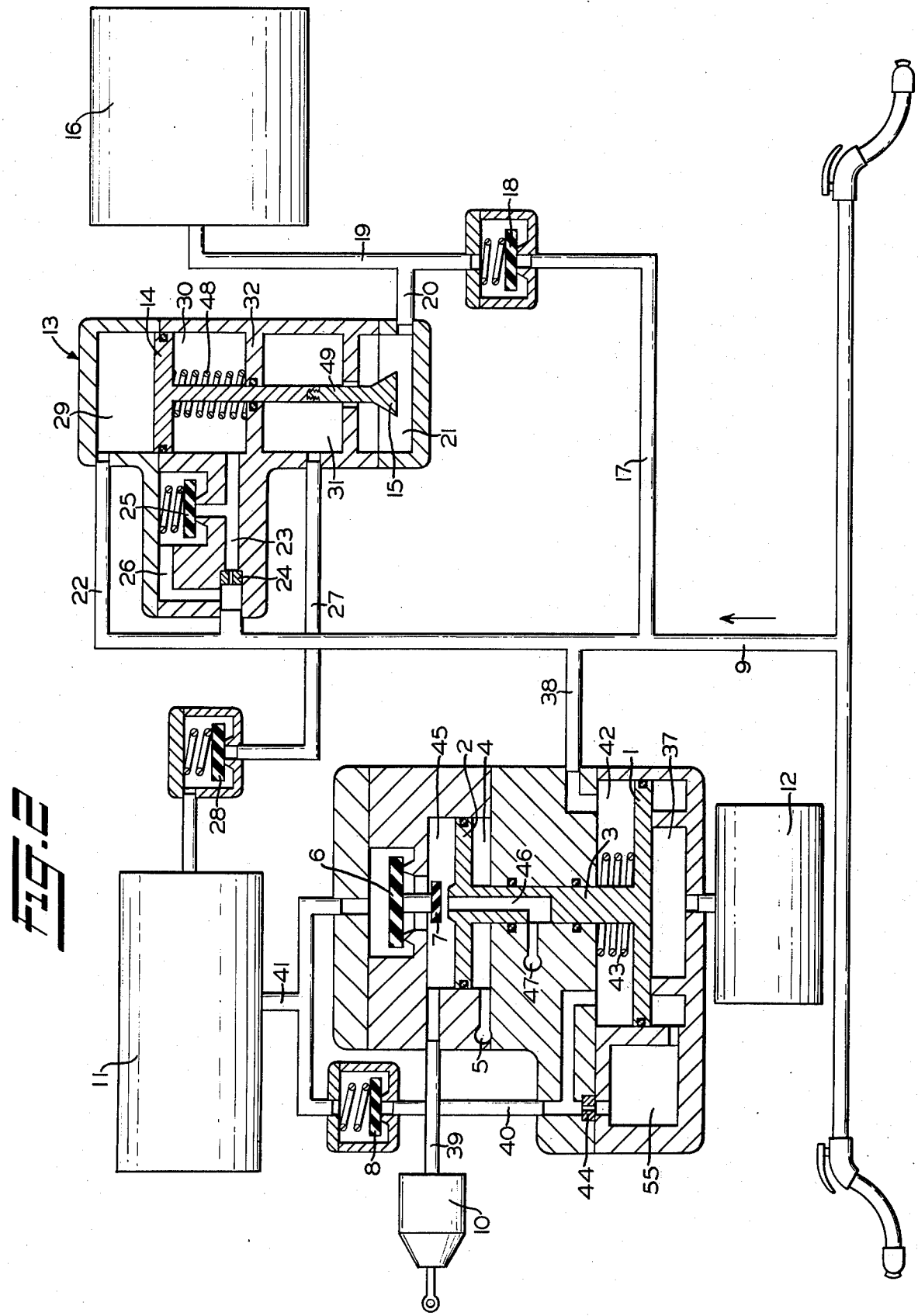
FIG. 2 shows the device of FIG. 1 in an operating phase different from that shown in FIG. 1.

The drive piston 14 will thus be forced downward sufficiently to open the intake valve 15 (which assumes the position shown in FIG. 2), and thus equalize the pressures between the supplementary reservoir 16 and the auxiliary reservoir 11 via line 27 and the check valve 28 to effect immediate pressure equalization between the two reservoirs 16 and 11.

Due to the great difference in capacity of the two reservoirs, the first of which is, say, twice as large as the second, the pressure of the auxiliary reservoir rises immediately above the value to which it had dropped during braking to a much higher value, which is the equilibrium value between the two reservoirs, so that the check valve 8 that controls recharge of the auxiliary reservoir 11 from the brake pipe 9 is closed, as is the check valve 18 through which the supplementary reservoir 16 is charged from the brake pipe 9, until the pressure in said brake pipe 9, which also prevails in the chamber 42 of the distributor during brake release, has risen to the new value equal to that in the auxiliary reservoir 11, which has increased considerably due to the equalization with the pressure in the supplementary reservoir 16.

Thus, since the resupply to the auxiliary reservoir 11 from the brake pipe 9 is impeded during this time, the pressure increase in said brake pipe 9 which is supplied with air by the brake valve on the locomotive is accelerated considerably because it has to fill only the brake pipe 9 and the chambers 42 of the distributors along the train.

Due to the more rapid increase in the pressure in these chambers 42, the brake release along the entire train is noticeably accelerated.

Following a rapid brake release with the aid of the accelerating device that admits the high pressure of the supplementary reservoir 16 into the auxiliary reservoir 11, the pressure in the lower chamber 30 of the relay valve 13 will, because of choke 24, reach a common level with that of the upper chamber 29 above the drive piston 14 at the higher pressure value of the brake pipe 9, thus permitting the weak spring 48 to raise the piston 14 again with the stem 49 to reclose the intake valve 15, thus cutting off the supplementary reservoir 16 from the auxiliary reservoir 11.

When a rapid brake release such as described above is followed by renewed braking and brake release as, for example, on a descent, two cases can occur.

If the pressure rises caused by the engine driver in the brake pipe 9 during brake release are slow or slight, the accelerating device will no longer intervene via the relay valve 13; the supplementary reservoir 16, which is isolated from the auxiliary reservoir 11 when the intake valve 15 is closed, will remain at its high equalization pressure with the auxiliary reservoir built up during the initial rapid brake release.

The system, with the auxiliary reservoir 11 isolated from the supplementary reservoir 16 by the intake valve 15, will behave like the normal graduated release distributor and will exhibit similar brake release times.

However, when the pressure increases caused by the engine driver are rapid during rebraking and brake release following an initial rapid brake release, the accelerating device will intervene during every brake release, and the intake valve 15 of the relay valve 13 will open communication between the supplementary and auxiliary reservoirs.

Successive rebraking will lower the single pressure of the auxiliary-supplementary reservoir system to a new value, but their excess pressure over and above that of the brake pipe 9 will continue to hold the check valves 8 and 18 closed to block air passage from the brake pipe 9, with the concomitant advantage that brake releases are accelerated until the single pressure of the two reservoirs has dropped due to absorption at the various areas below that to which the brake pipe 9 rises again, and the check valve 8 will reopen upon brake release to permit the auxiliary reservoir 11 to be resupplied.

The effect of the brake release accelerator ceases from this time on.

Thus, when the pressure in the brake pipe 9 increases, the check valve 18 reopens to resupply the supplementary reservoir 16, so that the auxiliary and supplementary reservoirs are recharged in parallel.

With reference to the variant of the present invention shown in FIG. 3, note that the latter differs from that shown in FIG. 1 only in that the supplementary reservoir 16 is initially charged or recharged via the association of a normal check valve 18 and a second check valve 60 biased toward the closed position by the action of an appropriate spring 51 inserted in series in the supply circuit of the supplementary reservoir 16 downstream from the latter and a calibrated orifice or choke 52 in parallel on the part of such circuit immediately downstream from the first check valve 18 and the reservoir itself, rather than being charged or recharged via a simple check valve 18.

The object of this device is to provide a certain delay in the charging or recharging of the supplementary reservoir 16 with respect to recharging or charging of the auxiliary reservoir 11, said delay being caused by the action of the spring 51, which, if it is to be opened under certain conditions of charging or recharging of the brake pipe 9, requires a difference in the pressure of the line prevailing in the chamber 53 downstream from the check valve 18 and that of the supplementary reservoir 16 prevailing in the chamber 54 downstream from the valve 60 (e.g. 0.4 kg/cm²).

This difference in pressure occurs temporarily, because eventually the pressure of the brake pipe 9 and that of the supplementary reservoir 16 tend to reach a common level via the calibrated orifice or choke 52 to complete charging or recharging of the latter reservoir 16 to the pressure in the brake pipe 9.

This initial charging device (as opposed to the use of the simple check valve 18 provided in the apparatus of FIG. 1) is advantageous for the following reasons:

When the system is charged from zero, it is more advantageous to use the auxiliary reservoir 11 rather than the supplementary reservoir 16, because specific pressures are then available sooner in the auxiliary reservoir 11 for possible premature braking than if the supplementary reservoir 16 were charged simultaneously with the auxiliary reservoir 11 via the simple check valve 18.

This is because the greater pressure undergoing stabilization in the auxiliary reservoir 11 during charging (due to the aforementioned retarding effect on the charging of the supplementary reservoir 16) cannot flow back to the supplementary reservoir 16 from the auxiliary reservoir 11 via the check valve 28.

Secondly, as stated above, when under certain conditions after a series of rapid braking and brake release processes with the intervention of the accelerating device, the single pressure of both the supplementary and the auxiliary reservoirs will drop due to absorption processes during braking below the pressure to which the brake pipe 9 rises in a subsequent brake release, and either the check valve 8 for recharging the auxiliary reservoir or a simple check valve 18 for recharging the supplementary reservoir 16 will open to permit the two reservoirs to be resupplied simultaneously.

From this moment on, the accelerating effect of brake release (effective until the single pressure of the two reservoirs is greater than that of the brake pipe during the brake release operations, so that aforementioned valves remain closed) will not only cease, but the pressure increases in the brake pipe 9, affected in the chamber 42 of the distributor by the absorption of air by the two reservoirs, would be noticeably decelerated, which would in turn decelerate brake release.

However, the use of the device for delayed recharge from the supplementary reservoir 16 provided in the apparatus of FIG. 3, which temporarily limits during each successive brake release the amount of air taken by the latter from the brake pipe 9 accelerates the pressure rise in the brake pipe itself, and the latter must preferentially supply only the auxiliary reservoir 11 via the check valve 8 during each brake release, which renders each successive brake release more rapid.

Having now described the invention, what I claim as new and desire to secure by Letters Patent, is:

1. In a fluid pressure brake apparatus of the type including a normally charged brake pipe, auxiliary reservoir, supplementary reservoir and control reservoir, a brake cylinder device, and a graduated release type brake control valve device operative in response to the reduction in the pressure in the brake pipe relative to the pressure in the control reservoir to effect the supply of fluid under pressure from the auxiliary reservoir to the brake cylinder device to cause a brake application, a relay valve device comprising;
    a. a normally closed valve for controlling flow of fluid under pressure from the supplementary reservoir to the auxiliary reservoir,
    b. a movable abutment operatively connected to said valve and having a pair of chambers disposed on the respective opposite sides thereof,
    c. a pair of conduits connecting said pair of chambers to said brake pipe, and
    d. a restriction means disposed in one of said conduits to render said movable abutment operative, independently of said brake control valve device, responsively to an increase of pressure in the brake pipe incident to initiating a brake release following a brake application, to open said valve for establishing a fluid pressure communication between the supplemental reservoir and the auxiliary reservoir to accelerate the build-up of pressure in said auxiliary reservoir independently of said increase of pressure in the brake pipe.

2. The fluid pressure brake apparatus, as recited in claim 1, further characterized in that the pressures in said pair of chambers are equal while the brakes are released.

3. The fluid pressure brake apparatus, as recited in claim 1, further characterized by a check valve device so disposed in bypassing relation to said restriction means as to enable unrestricted flow of fluid under pressure from one of said pair of chambers to said brake pipe and prevent flow from said brake pipe to said one chamber via said check valve device.

4. The fluid pressure brake apparatus, as recited in claim 1, further characterized by a check valve device so disposed as to enable flow of fluid under pressure from the brake pipe to the supplementary reservoir and prevent flow from the supplementary reservoir to the brake pipe.

5. The fluid pressure brake apparatus, as recited in claim 1, further characterized by a check valve device so disposed between said relay valve device and said auxiliary reservoir as to enable flow of fluid under pressure from said relay valve device to the auxiliary reservoir and prevent flow from the auxiliary reservoir to said relay valve device.

6. The fluid pressure brake apparatus, as recited in claim 1, further characterized by a pair of spring-biased check valve devices arranged in series and so disposed as to enable flow of fluid under pressure from the brake pipe serially through said pair of check valve devices to the supplementary reservoir, and a restricted means disposed in bypassing relation between the outlet of the first of said pair of check valve devices and the supplementary reservoir, the size of said restricted means determining the difference between the outlet pressure of said first check valve device and the outlet pressure of the other of said pair of check valve devices.

* * * * *

UNITED STATES PATENT AND TRADEMARK OFFICE
CERTIFICATE OF CORRECTION

PATENT NO. : 3,994,536
DATED : November 30, 1976
INVENTOR(S) : Cesare Prada

It is certified that error appears in the above–identified patent and that said Letters Patent are hereby corrected as shown below:

Title page, change assignee to: WABCO Westinghouse
Torino, Italy

Signed and Sealed this

Nineteenth Day of April 1977

[SEAL]

Attest:

RUTH C. MASON
*Attesting Officer*

C. MARSHALL DANN
*Commissioner of Patents and Trademarks*